US008725518B2

(12) United States Patent
Waserblat et al.

(10) Patent No.: US 8,725,518 B2
(45) Date of Patent: May 13, 2014

(54) AUTOMATIC SPEECH ANALYSIS (75) Inventors: Moshe Waserblat, Modiin (IL); Barak Eilam, Tel Aviv (IL)

(73) Assignee: Nice Systems Ltd., Ra'anana (IL)

(*) Notice: Subject to any disclaimer, the term of this patent is extended or adjusted under 35 U.S.C. 154(b) by 956 days.

(21) Appl. No.: 11/411,764

(22) Filed: Apr. 25, 2006

(65) Prior Publication Data

US 2007/0250318 A1 Oct. 25, 2007

(51) Int. Cl.
*G10L 21/06* (2013.01)
*G10L 19/06* (2013.01)
*G10L 15/00* (2013.01)
*G10L 25/00* (2013.01)

(52) U.S. Cl.
USPC ........... 704/276; 704/209; 704/224; 704/236; 704/270

(58) Field of Classification Search
USPC .................................. 704/236, 276
See application file for complete search history.

(56) References Cited

U.S. PATENT DOCUMENTS

| 4,145,715 A | 3/1979 | Clever |
| 4,527,151 A | 7/1985 | Byrne |
| 4,780,906 A * | 10/1988 | Rajasekaran et al. ......... 704/251 |
| 5,051,827 A | 9/1991 | Fairhurst |
| 5,091,780 A | 2/1992 | Pomerleau |
| 5,303,045 A | 4/1994 | Richards et al. |
| 5,307,170 A | 4/1994 | Itsumi et al. |
| 5,353,618 A | 10/1994 | Roper et al. |
| 5,404,170 A | 4/1995 | Keating |
| 5,491,511 A | 2/1996 | Odle |
| 5,519,446 A | 5/1996 | Lee |
| 5,734,441 A | 3/1998 | Kondo et al. |
| 5,742,349 A | 4/1998 | Choi et al. |
| 5,751,346 A | 5/1998 | Dozier et al. |
| 5,790,096 A | 8/1998 | Hill, Jr. |
| 5,796,439 A | 8/1998 | Hewett et al. |
| 5,847,755 A | 12/1998 | Wixson et al. |
| 5,895,453 A | 4/1999 | Cook |
| 5,920,338 A | 7/1999 | Katz |

(Continued)

FOREIGN PATENT DOCUMENTS

| DE | 1 0 358 333 | 7/2005 |
| EP | 1 484 892 | 8/2004 |

(Continued)

OTHER PUBLICATIONS

Neumeyer et al, "Automatic Scoring of Pronunciation Quality", 2000, Elsevier Sciences, p. 83-93.*

(Continued)

*Primary Examiner* — Richemond Dorvil
*Assistant Examiner* — Olujimi Adesanya
(74) *Attorney, Agent, or Firm* — Soroker-Agmon (57) ABSTRACT

A system for providing automatic quality management regarding a level of conformity to a specific accent, including, a recording system, a statistical model database with statistical models representing speech data of different levels of conformity to a specific accent, a speech analysis system, a quality management system. Wherein the recording system is adapted to record one or more samples of a speakers speech and provide it to the speech analysis system for analysis, and wherein the speech analysis system is adapted to provide a score of the speakers speech samples to the quality management system by analyzing the recorded speech samples relative to the statistical models in the statistical model database.

22 Claims, 4 Drawing Sheets

(56) References Cited

U.S. PATENT DOCUMENTS

| | | | |
|---|---|---|---|
| 5,995,932 A * | 11/1999 | Houde | 704/261 |
| 6,014,647 A | 1/2000 | Nizzar et al. | |
| 6,028,626 A | 2/2000 | Aviv et al. | |
| 6,031,573 A | 2/2000 | Maccormack et al. | |
| 6,037,991 A | 3/2000 | Thro et al. | |
| 6,070,142 A | 5/2000 | McDonough et al. | |
| 6,081,606 A | 6/2000 | Hansen et al. | |
| 6,092,197 A | 7/2000 | Coueignoux | |
| 6,094,227 A | 7/2000 | Guimier | |
| 6,111,610 A | 8/2000 | Faroudja | |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,212,178 B1 | 4/2001 | Beck et al. | |
| 6,230,197 B1 | 5/2001 | Beck et al. | |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,333,979 B1 * | 12/2001 | Bondi et al. | 379/219 |
| 6,345,305 B1 | 2/2002 | Beck et al. | |
| 6,424,937 B1 * | 7/2002 | Kato et al. | 704/207 |
| 6,427,137 B2 | 7/2002 | Petrushin | |
| 6,542,602 B1 * | 4/2003 | Elazar | 379/265.06 |
| 6,549,613 B1 | 4/2003 | Dikmen | |
| 6,553,217 B1 | 4/2003 | Kundorf | |
| 6,570,608 B1 | 5/2003 | Tserng | |
| 6,598,021 B1 * | 7/2003 | Shambaugh et al. | 704/270 |
| 6,604,108 B1 | 8/2003 | Nitahara | |
| 6,628,835 B1 | 9/2003 | Brill et al. | |
| 6,704,409 B1 | 3/2004 | Dilip et al. | |
| 6,798,876 B1 * | 9/2004 | Bala | 379/265.12 |
| 6,882,707 B2 * | 4/2005 | Engelke et al. | 379/52 |
| 6,978,006 B1 * | 12/2005 | Polcyn | 379/265.12 |
| 7,003,462 B2 * | 2/2006 | Shambaugh et al. | 704/270 |
| 7,023,979 B1 * | 4/2006 | Wu et al. | 379/265.11 |
| 7,076,427 B2 | 7/2006 | Scarano et al. | |
| 7,085,719 B1 * | 8/2006 | Shambaugh et al. | 704/251 |
| 7,103,806 B1 | 9/2006 | Horvitz | |
| 7,191,133 B1 * | 3/2007 | Pettay | 704/270 |
| 7,219,059 B2 * | 5/2007 | Gupta et al. | 704/240 |
| 7,222,075 B2 * | 5/2007 | Petrushin | 704/270 |
| 7,299,188 B2 * | 11/2007 | Gupta et al. | 704/276 |
| 2001/0052081 A1 | 12/2001 | Mckibben et al. | |
| 2002/0005898 A1 | 1/2002 | Kawada | |
| 2002/0010705 A1 | 1/2002 | Park et al. | |
| 2002/0046030 A1 * | 4/2002 | Haritsa et al. | 704/256 |
| 2002/0059283 A1 | 5/2002 | Shapiro et al. | |
| 2002/0087385 A1 | 7/2002 | Vincent | |
| 2002/0194002 A1 * | 12/2002 | Petrushin | 704/270 |
| 2003/0033145 A1 | 2/2003 | Petrushin | |
| 2003/0059016 A1 | 3/2003 | Lieberman et al. | |
| 2003/0163360 A1 | 8/2003 | Galvin | |
| 2004/0096050 A1 * | 5/2004 | Das et al. | 379/265.12 |
| 2004/0098295 A1 | 5/2004 | Sarlay et al. | |
| 2004/0141508 A1 | 7/2004 | Schoeneberger et al. | |
| 2004/0161133 A1 | 8/2004 | Elazar et al. | |
| 2004/0215451 A1 * | 10/2004 | Macleod | 704/231 |
| 2004/0249650 A1 * | 12/2004 | Freedman et al. | 705/1 |
| 2005/0165602 A1 * | 7/2005 | Cote et al. | 704/9 |
| 2005/0255431 A1 * | 11/2005 | Baker | 434/169 |
| 2006/0004567 A1 * | 1/2006 | Russell | 704/209 |
| 2006/0020462 A1 * | 1/2006 | Reich | 704/254 |
| 2006/0067508 A1 * | 3/2006 | Basson et al. | 379/265.12 |
| 2006/0072727 A1 * | 4/2006 | Bantz et al. | 379/201.04 |
| 2006/0093135 A1 | 5/2006 | Flatal et al. | |
| 2007/0067174 A1 * | 3/2007 | Verma et al. | 704/276 |
| 2008/0147404 A1 * | 6/2008 | Liu et al. | 704/256.2 |

FOREIGN PATENT DOCUMENTS

| | | |
|---|---|---|
| WO | 95/29470 A | 11/1995 |
| WO | 98/01838 A | 1/1998 |
| WO | 00/73996 | 12/2000 |
| WO | 02/37856 | 5/2002 |
| WO | 03/013113 A2 | 2/2003 |
| WO | 03/067360 A2 | 8/2003 |
| WO | 03/067884 A1 | 8/2003 |
| WO | 2004/091250 | 10/2004 |

OTHER PUBLICATIONS

Huang et al, "Accent Issues in Large Vocabulary Continuous speech Recognition", 2004, Kluwer academic Publishers, p. 141-153.*

Chen et al, "Automatic Accent Identification using Gaussian Mixture Models", 2002, IEEE, p. 343-346.*

Arslan et al, "Language Accent Classification in American English", 1996, Elsevier Sciences, p. 353-367.*

Ronen, "Automatic Detection of Mispronunciation for Language Instruction" 1997, European Conference on Speech Communication and Technology.*

Hansen et al, "Foreign Accent Classification Using Source Generator Based Prosodic Features", 1995, Proc. ICASSP p. 836-839.*

Schultz et al, "Speaker, Accent, and Language IdentificationUsing Multilingual Phone Strings", HLT 2002, San Diego, California, Mar. 2002, pp. 1-8.*

Aharonot, Y., "The Camera that Never Sleeps".

Aimir, N., et al., "Towards an Automatic Classification of Emotions in Speech".

Article Sertainty—Automated Quality Monitoring—SER solutions, Inc.—21680, www.ser.com, Ridgetop Circle Dulles, Va.

Article Sertainty—Agent Performance Optimization—2005 SE Solutions, Inc.

"Beyond Compliance" Information Week retrieved from www.informationweek.com/story/IWK20030223S0002/2 (Mar. 5, 2003).

Bimbot, F. et al., "A tutorial on text-independent verification" (Aug. 8, 2003).

Chaudhari, V., et al., Very large Population Text Independent Speaker Identification Using Transformation Enhanced Multi-grained Models (Oct. 2000).

Chen, Q., at al., "A Data Warehouse/OLAP Framework for Scalable Telecommunication Tandem Traffic Analysis".

Dror, Y.,"The Computer at the other end of the line" Ha'aretz, (Feb. 17, 2002).

Freedman, I., Closing the contact center quality loop with the customer experience management, Customer Interaction Solutions. vol. 19, No. 9, (Mar. 2001).

Financial Companies want to turn Regulatory burden into Competitive advantage, Feb. 24, 2003 from Information Week, http://www.informationweek.com/story/IWK20030223S0002.

Mark, L.R., et al., "White Paper-Sertainty Quality Assurance" SER Solutions Inc. (2003-2005).

Nice Vision-Secure your Vision, a prospect by NICE Systems Ltd.

NICE Systems announces New Aviation Security Initiative, Reprinted from Security and Technology & Design.

PR Newswire, NICE Redefines Customer Interactions with Launch of Customer Experience Management (Jun. 13, 2000).

PR Newswire, Rcognition Systems and Hyperion to provide Closed Loop CRM Analytic Applications (Nov. 17, 1999).

Reynolds, D.R., Robust Text Independent Speaker Identification Using Gaussian Mixture Speaker Models—IEEE Transactions on Speech and Audio Processing, vol. 3, No. 1, (Jan. 1995).

Reynolds, D.A., et al., "Speaker Verification Using Adapted Gaussian Mixture Models" (Oct. 1, 2000).

Robust Test Independent Speaker Identification Using Gaussian Mixture Speaker Models.

SEDOR-Internet pages from http://www.dallmeier-electronic.com.

Zigel, Y., et al., "How to deal with multiple-targets in speaker identification systems?".

Bimbot, F., et al., "A tutorial on Text-Independent Speaker Verification", EURASIP Journal on Applied Signal Processing 2004:3, pp. 430-451 (2004).

Muthusamy, Y., et al., "Reviewing Automatic Language Identification", IEEE Signal Processing, pp. 33-41 (Oct. 1994).

Zissman, M.A., et al., "Comparison of Four Approaches to Automatic Language Identification of Telephone Speech", IEEE Transactions on Speech and Audio Processing, vol. 4, No. 1, pp. 31-44 (Jan. 1996).

* cited by examiner

AUTOMATIC SPEECH ANALYSIS

FIELD OF THE INVENTION

The present invention relates generally to automatic association of speech based on speaker characteristics using statistical calculations.

BACKGROUND OF THE INVENTION

Many professions require verbal interaction with clients, for example sales people, bank clerks, and help desk support personnel. Typically, the ability to communicate with the client is not only affected by speaking the same language but also affected by being able to understand the client's accent. In some cases people speaking the same language cannot understand each other because of the accents they are accustomed to. Some accents are considered clearer than others and may be preferred or required for use by people in certain professions, for example television and radio broadcasters.

Nowadays many companies provide telephonic support services, wherein human employees are trained to speak with a clear accent. In some cases these services are outsourced to foreign countries, wherein a foreign language is spoken. The employees performing the service are trained to speak the required language with a desired accent.

Typically a person easily identifies in a short time if another person is speaking with the same accent as accepted in their geographical location or speaks with a different accent. Some people can identify a person's geographical origin based on their accent.

Accent training, and monitoring a trainee's progress is generally expensive and requires individual attention.

U.S. application Ser. No. 10/996,811 filed Nov. 23, 2004, the disclosure of which is incorporated herein by reference, describes a statistical method for speaker spotting in order to split a conversation into separate parts containing the speech of each speaker.

In an article by Yeshwant K. Muthusamy et al. titled "Reviewing Automatic Language Identification" IEEE Signal Processing Magazine October 1994, there is described automated methods of language identification.

In an article by Marc A. Zissman et al. "Comparison of Four Approaches to Automatic Language Identification of Telephone Speech", IEEE Transactions on Speech and Audio Processing, Vol. 4, No. 1, January 1996, there is also described automated methods of language identification.

The above articles describe preparing a statistical model to represent a speech segment or collection of speech segments.

In Frederic Bimbot et al., there is described "A Tutorial on Text-Independent Speaker Verification", EURASIP Journal on Applied Signal Processing 2004: 4, 430-451. This article describes the use of statistical method for identifying a user.

Prior art machines dealing with accents are typically used to train a person's accent by requiring the person to repeat a specific word or phrase and comparing the answer to a known digitized pattern. These machines are limited to specific phrases and are not applicable to non pre-selected speech.

SUMMARY OF THE INVENTION

An aspect of an embodiment of the invention relates to a system and method for providing feedback to a speaker regarding their level of conformity to a desired accent. In an exemplary embodiment of the invention, the speaker's speech is recorded and a statistical model is created from the recorded speech. The statistical model is then compared to previously prepared statistical models of speakers with known different levels of conformity to the desired accent, for example wherein the levels are determined by a human expert. Optionally, the system determines the closest statistical model to the recorded speech thus providing a rough level of conformity to the required accent. In an exemplary embodiment of the invention, the system determines a level of closeness of the created statistical model and the determined closest statistical model in order to provide a score regarding the level of closeness of the recorded speech and the desired accent.

Optionally, the score is provided as feedback to the speaker, in order to improve his or her accent. In some embodiments of the invention, the feedback is provided to a supervisor to take remedial actions, for example review the speakers conversations and point out problems to the speaker.

In some embodiments of the invention, the system provides speech segments from the recorded speech that differ the most from the required accent.

A further aspect of an embodiment of the invention, relates to a system and method for automatically identifying a persons accent. In an exemplary embodiment of the invention, a computer receives a digital signal representing a segment of the person's speech. The computer parses the segment and prepares a representation model of the speech segment. The computer compares the representation model to previously stored models representing one or more accents. The computer determines which pre-stored accent model is closest to the model of the received signal and gives a score representing the measure of conformity to it. In some embodiments of the invention, the computer gives indication regarding segments of the digital signal which do not conform to the determined closest accent.

In an exemplary embodiment of the invention, the automated system queries a caller and analyzes the caller response to determine the accent used by the caller.

In some embodiments of the invention, the automated system is used to train people to speak with a specific accent. In some embodiments of the invention, the automated system gives a score representing the closeness of a monitored person to the desired accent. Optionally, the automated system specifies speech segments, which relatively digress from the determined accent.

In some embodiments of the invention, the automated system operates online in order to give indication in real-time, for example pointing out to a user if he or she digress from the correct accent (e.g. when the user is tired or stressed). Alternatively, the automated system analyzes the received speech segment at a later time and gives indication as a report to the user, an instructor or an employer to determine if the user is progressing over time.

Additionally, an employer can be given immediate feedback or long-term feedback regarding the performance of an employee in conforming to the desired accent.

In some embodiments of the invention, the received segment is pre-processed by the computer to eliminate effects to the accent determination, for example related to other characteristics of the speaker, for example age group or sex. Alternatively or additionally, the system determines details of the other characteristics (e.g. sex) in addition to the accent.

In an exemplary embodiment of the invention, segments not abiding to the determined accent are automatically replaced or amended to conform to the determined accent.

There is thus provided in accordance with an exemplary embodiment of the invention, a system for providing automatic quality management regarding a level of conformity to a specific accent, comprising:

a recording system;

a statistical model database with statistical models representing speech data of different levels of conformity to a specific accent;

a speech analysis system;

a quality management system;

wherein the recording system is adapted to record one or more samples of a speakers speech and provide it to the speech analysis system for analysis;

wherein the speech analysis system is adapted to provide a score of the speakers speech samples to the quality management system by analyzing the recorded speech samples relative to the statistical models in the statistical model database. Optionally, analysis of the recorded speech samples by the speech analysis system comprises:

preparing a statistical model from the speech samples; and comparing it to other statistical models in the statistical model database to determine the closest model and a level of conformity to the closest model.

In an exemplary embodiment of the invention, the quality management system is adapted to provide feedback to the speaker. Optionally, the quality management system is adapted to provide feedback to a supervisor. In an exemplary embodiment of the invention, the quality management system is adapted to provide feedback regarding the performance of the speaker based on the provided score and previous provided scores of the speaker. Optionally, the feedback further comprises specific speech segments with a maximum level of deviation from the model which most conforms to a specific accent.

There is thus additionally provided in accordance with an exemplary embodiment of the invention, a method of providing automated feedback to a speaker regarding conformity of their accent to a specific accent, comprising:

recording one or more samples of the speakers speech;

producing a statistical model from said speech samples;

comparing the produced statistical model to previously prepared statistical models of speech samples with different levels of conformity to a specific accent;

determining the model that conforms the best to the produced statistical model and a level of conformity to the best conforming model; and providing as feedback a score for the speech samples regarding its conformity to the specific accent based on the determining. Optionally, the feedback further comprises specific speech segments with a maximum level of deviation from the best conforming model. In an exemplary embodiment of the invention, the feedback takes into account scores of the speaker from previous recordings.

There is thus additionally provided in accordance with an exemplary embodiment of the invention, a method of automatic accent identification for quality management comprising:

creating one or more statistical accent models representing accents from one or more collections of training speech data;

inputting a speech signal for analysis;

preparing a statistical speech model representing the input speech signal;

comparing the statistical speech model with the one or more statistical accent models;

calculating a score resulting from the comparison of the statistical speech model with each statistical accent model;

determining a closest statistical accent model to the statistical speech model; and providing the scores to a quality management system to provide feedback.

Optionally, the determining is performed substantially in real-time. In some embodiments of the invention, the method further comprises giving indication regarding segments of the speech signal which do not conform to the determined closest statistical accent module. Optionally, the indication is given substantially in real-time. In an exemplary embodiment of the invention, the quality management system provides indication regarding the quality of the accent of a user. Optionally, the method further comprises notifying a user if the determined closest statistical accent changes during a conversation. In an exemplary embodiment of the invention, the determining further determines other characteristics of a speaker. Optionally, the one or more statistical models are updated based on speech signals from groups of substantially equal scoring users.

BRIEF DESCRIPTION OF THE DRAWINGS

The present invention will be understood and appreciated more fully from the following detailed description taken in conjunction with the attached drawings. Identical structures, elements or parts, which appear in more than one figure, are generally labeled with a same or similar number in all the figures in which they appear, wherein.

DETAILED DESCRIPTION

Figure 1:
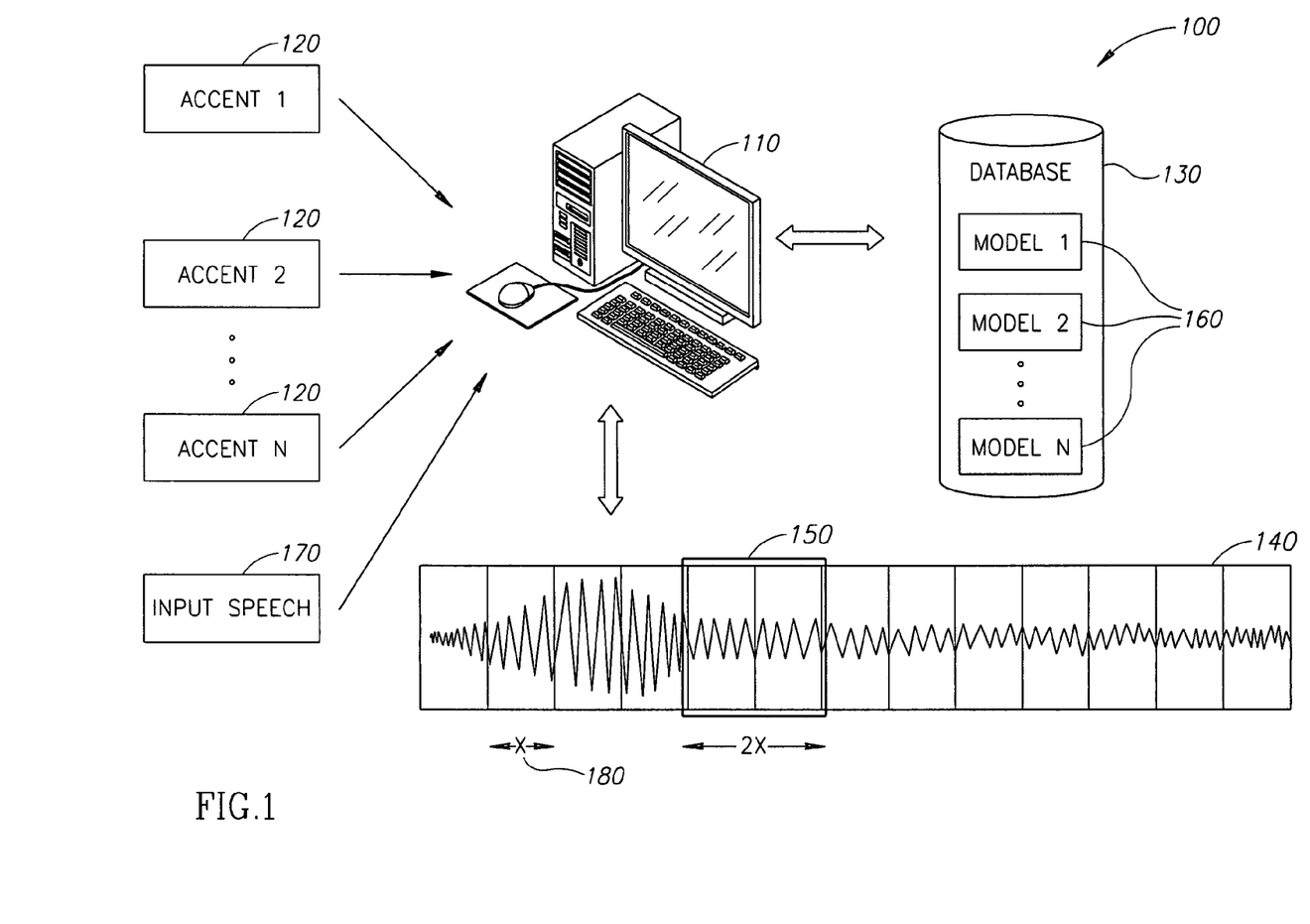
FIG. 1 is a schematic illustration of a system for analyzing speech to determine the accent used by the speaker, according to an exemplary embodiment of the invention.

FIG. 1 is a schematic illustration of a system 100 for analyzing speech to determine the accent used by the speaker, according to an exemplary embodiment of the invention. In an exemplary embodiment of the invention, system 100 comprises tools for performing speech analysis, for example using a computer 110 and a database 130. In an exemplary embodiment of the invention, system 100 is trained to recognize one or more different accents to which it can compare an input speech signal 170. Optionally, one or more collections of speech data 120, each containing speech samples of a specific accent, are provided to computer 110 in order to build statistical models 160 for comparing with input speech signal 170.

In some embodiments of the invention, multiple collections of speech data 120 are used to create multiple models for each accent, representing people with different speech characteristics, for example men and women, children and grown ups. Alternatively the models are created by extracting accent related details from collections of speech data 120 and the models are normalized relative to other differences, for example level of conformity to a specific accent.

In an exemplary embodiment of the invention, computer 110 using an analysis program accepts a collection of speech data 120 as a digital signal 140 and parses it into small segments 180, for example each of duration of about 10 ms. Optionally, a virtual window 150 of a size larger than segments 180 (for example twice as big), is used to inspect each segment. Optionally, window 150 detects the basic accent related details in digital signal 140 and creates a statistical model 160 which represents the frequency of each type of sound or statistical likelihood of occurrence of sound combinations in the accent being inspected.

In an exemplary embodiment of the invention, model 160 is created based on details such as:

Phonology—phone sets used by the accent.
Acoustic phonetics—frequency of occurrence of phones.
Phonotactics—rules governing combinations of phones.
Prosody—duration, pitch, and stress of the sounds used and their frequency of appearance.

Optionally, statistical models 160 are stored in database 130, internal to computer 110. Alternatively, database 130 is external to computer 110, for example on a network server.

In some embodiments of the invention, the building process of statistical models 160 is performed using learning algorithms, for example neural networks or Hidden Markov Models (HMM) similar to the methods used for language determination as described in the articles mentioned above.

Figure 2:
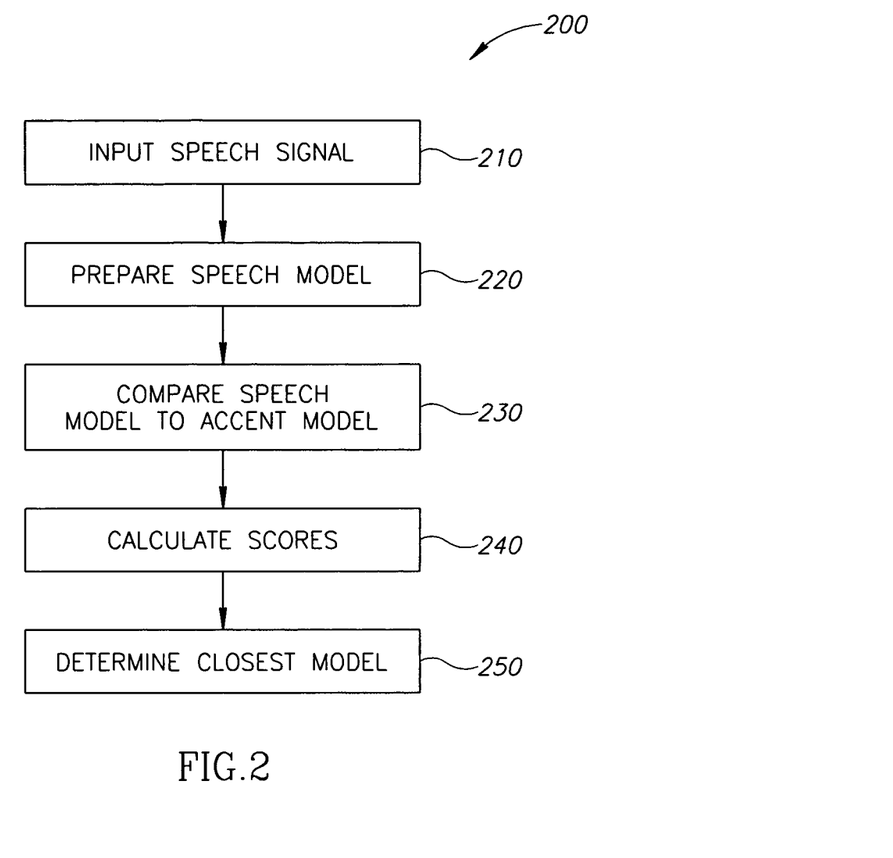
FIG. 2 is a flow diagram of a method of determining an accent using an automated system, according to an exemplary embodiment of the invention.
Figure 3:
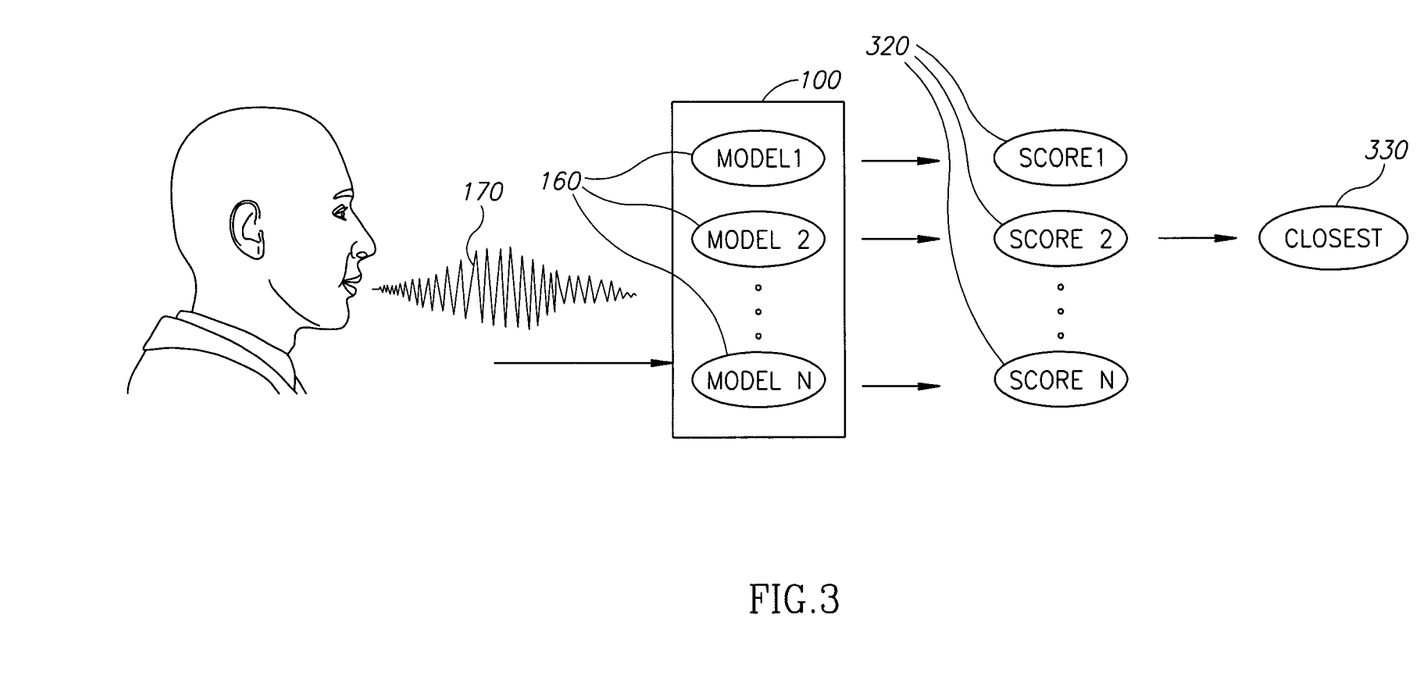
FIG. 3 is a schematic illustration of analysis of a speech signal by the system for analyzing speech, according to an exemplary embodiment of the invention.

FIG. 2 is a flow diagram of a method 200 of determining an accent using automated system 100, according to an exemplary embodiment of the invention, and FIG. 3 is a schematic illustration of the process of analysis of an input speech signal 170 by system 100, according to an exemplary embodiment of the invention.

In an exemplary embodiment of the invention, after training system 100 and creating a set of reference statistical models 160, system 100 is ready to analyze input speech signal 170 and determine if it conforms to any of models 160. Optionally, system 100 inputs (210) input speech signal 170 for analysis. System 100 processes input speech signal 170 and prepares (220) a model representing input speech signal 170 according to a similar process as described above for preparing the reference statistical models 160. Optionally, system 100 compares (230) the model created for input speech signal 170 with models 160 and produces (240) a score 320 representing a measure of conformity of input speech signal 170 to models 160.

In an exemplary embodiment of the invention, system 100 determines (250) the accent whose model 160 results in a score 320 with the closest match 330 to the model of input speech signal 170. In an exemplary embodiment of the invention, the comparison and selection is performed using Gaussian Mixture Models (GMM) as is known in the art. Alternatively, other statistical methods can be used to determine the closest matching model 330 to input speech signal 170. Optionally, a threshold value is selected, so that if input speech signal 170 is not close enough to any of the models, no model will be selected as representing the closest accent.

In some embodiments of the invention, once determining the closest accent, to input speech signal 170, system 100 determines segments of input speech signal 170, which do not conform to the accent, for example due to errors or inability of the speaker. In some embodiments of the invention, system 100 reports these errors for future training of the speaker. Alternatively, in a real-time system, system 100 may amend known errors by replacing specific waveforms of the digital representation with an amended waveform.

In an exemplary embodiment of the invention, during a conversation, system 100 analyzes the speech of a single participant. Alternatively, system 100 analyzes the entire conversation and splits the speech signal to a segment for each speaker according to methods for example as described in the application incorporated above by reference.

In some embodiments of the invention, system 100 analyzes speech data in real time, and continuously determines the closest accent relative to input speech signal 170. Optionally, the determined closest accent may change responsive to changes in the accent used by the speaker being monitored.

In some embodiments of the invention, every sentence or a speech segment of a preset time interval is analyzed to determine the closest accent. Alternatively, the beginning of a conversation is analyzed to determine the closest accent and the continuation is analyzed for conformity to the determined accent.

In an exemplary embodiment of the invention, system 100 serves to identify a caller's accent and select a call responder that matches the callers accent. Alternatively or additionally, system 100 serves to monitor a call responder and give indication if the responder is digressing from the required accent.

In some embodiments of the invention, system 100 queries the caller with questions that will invoke answers that will assist the system in determining the caller's accent, for example by asking the caller a question that requires a long response. In some embodiments of the invention, the caller can be asked to repeat a specific sentence with pre selected sounds that are known to differentiate between different accents of a specific language in order to shorten the determination process and/or assure its success.

In some embodiments of the invention, system 100 is used to train a speaker to speak with a specific accent. In some embodiments of the invention, system 100 is used to test a speaker regarding his or her ability to speak with a certain accent, for example to screen job applicants or rank employees according to speech clarity.

In some embodiments of the invention, system 100 is used to track progress of a trainee in learning a new accent or improving their accent.

Figure 4:
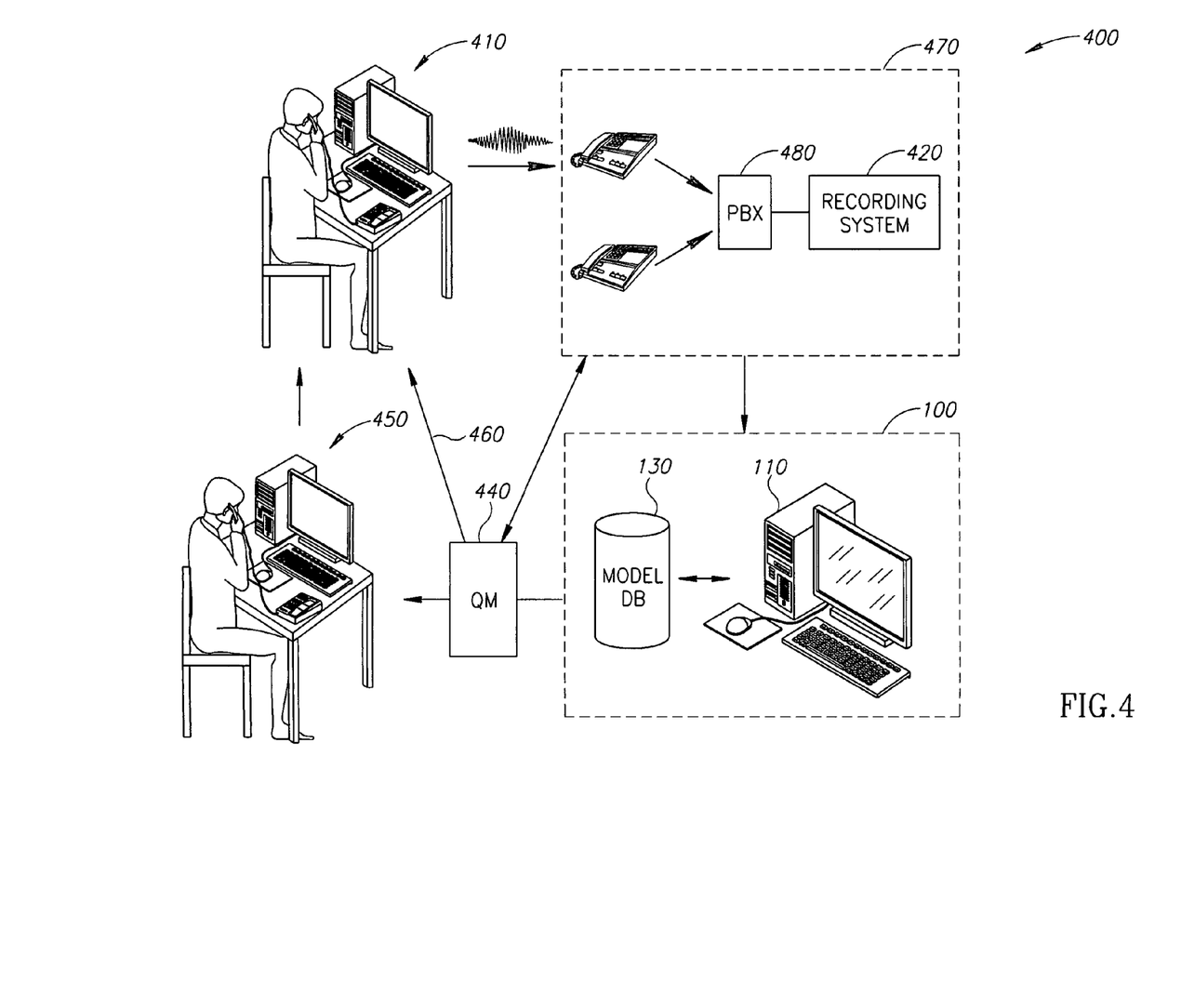
FIG. 4 is a schematic illustration of a system for analyzing a speaker's accent and providing feedback, according to an exemplary embodiment of the invention.

FIG. 4 is a schematic illustration of a system 400 for analyzing a speaker's accent and providing feedback, according to an exemplary embodiment of the invention. In an exemplary embodiment of the invention, an agent 410 accepts calls from people and provides verbal assistance, for example wherein agent 410 serves as a customer service representative or a help line technician. Optionally, the conversations of the agent and other agents are controlled by a call contact center 470, which controls the reception of calls by agents and records the calls. In an exemplary embodiment of the invention, call contact center includes a private branch exchange (PBX) controller 480 to navigate calls from customers to the receiving agents. Additionally, call contact center 470 includes a recording system 420 to record the conversations between the clients and the agents.

In an exemplary embodiment of the invention, system 100 is used to analyze the speech data as described above. Optionally, computer 110 of system 100 is used to analyze the speech data with the aid of model database 130 that stores predetermined accent models. In an exemplary embodiment of the invention, computer 110 receives recorded conversations from recording system 420 to analyze an agent's speech for conformity to the predetermined models of the required accent and other accents.

In an exemplary embodiment of the invention, multiple models are prepared for a specific accent and stored in model database 110 of system 100 as described above. Each of the multiple models is based on a pre-graded selection of speech data. Optionally, a supervisor gives a score for many speech sessions of agents, for example the score values can be 100%, 90%, 80% and so forth. Computer 110 prepares a model for each score (100%, 90% . . . ) and these models are used in the accent determination by computer 110. In an exemplary embodiment of the invention, computer 110 determines a score based on the score of the model which is closest to the speech sample being evaluated. Additionally, computer 110 determines a level of conformity to the closest model. Optionally, these values are used to provide a score for the evaluated speech sample. In some embodiments of the invention, computer 110 additionally, compares the speech sample with the best model and provides exemplary speech segments from the evaluated speech sample, which deviate the most from the best model.

In an exemplary embodiment of the invention, the determined scores and samples are provided to a quality management system 440 (e.g. comprising a computer and a database) and are accumulated for each agent 410 over a period of time, for example a few days or a few weeks. Optionally, quality management system 440 evaluates an agents results over a period of time, to determine the agents weak points and if the agent is improving or not. Optionally, quality management system 440 provides the information as feedback 460 to a supervisor 450 and/or to agent 410 so that agent 410 and/or supervisor 450 can take remedial actions, for example providing additional training regarding the agents weak points.

In some embodiments of the invention, the computer evaluation can be performed online during the duration of the conversation conducted by agent 410 and give immediate feedback taking into account previous evaluations, for example computer 110 can provide a visual feedback indicating a level of deviation of the agent from the required accent. Optionally, quality management system 440 may be connected directly to call contact center 470 in order to extract specific speech segments for providing to supervisor 450 or agent 410.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

Section headings are provided for assistance in navigation and should not be considered as necessarily limiting the contents of the section.

It will be appreciated by persons skilled in the art that the present invention is not limited to what has been particularly shown and described hereinabove. Rather the scope of the present invention is defined only by the claims, which follow.

The invention claimed is:

1. A system for providing quality management related to an accent of a call responder handling a call in a contact center, comprising:
    a statistical model database with statistical accent models, each statistical accent model associated with an accent, based on accent related details from collections of speech instances that are further normalized relative to differences therebetween for accent conformity, and with a model accent score representing the conformity of the statistical accent model to the associated accent, and created from speech data;
    a recording system for recordings a speech sample of a call responder having a call responder accent;
    a speech analysis system for receiving said speech sample;
    associating a score with the call responder accent by analyzing said speech sample relative to the statistical accent models in said statistical model database, and indicating a specific model of the statistical accent models to which the speech sample is closest, and automatically amending in said speech sample by replacement waveforms, sections determined as having known errors, whereby the amended speech sample replaces said speech sample to conform to the specific accent model; and
    providing during the call conducted by the call responder an immediate visual feedback indicating the level of deviation of the agent from the required accent.

2. A system according to claim 1, wherein analysis of said speech sample by said speech analysis system comprises:
    preparing a statistical model from said speech sample; and
    comparing it to other statistical models in said statistical model database to determine the specific model and a level of conformity to the specific model.

3. A system according to claim 1, wherein said quality management system is adapted to provide feedback regarding the call responder accent based on a current score and a previous score of the call responder.

4. A system according to claim 1, wherein said feedback further comprises specific speech segments with a maximum level of deviation from a model associated with the call responder accent and with a highest score.

5. The system of claim 1, wherein said statistical model database represents people with different speech characteristics.

6. The system of claim 5, wherein the different speech characteristics are accents of a man, a woman or a child.

7. The system of claim 1, wherein the statistical accent models are created using at least one feature selected from the group consisting of: phonology, acoustic phonetics, and phonotactics.

8. The system according to claim 1, further comprising a quality management system for providing feedback related to the accent score to a supervisor of the call responder.

9. The system according to claim 1, further comprising asking a caller to repeat a specific sentence with pre-selected sounds that are known to differentiate between different accents.

10. The system according to claim 1, further comprising assigning the call responder with an accent score corresponding to the model accent score associated with the specific model.

11. A method for providing quality management related to an accent of a call responder handling a call in a contact center, comprising:
    creating one or more statistical accent models from one or more training speech data, each statistical accent model associated with an accent, based on accent related details from collections of speech instances that are further normalized relative to differences therebetween for accent conformity, and with a model accent score representing the conformity of the statistical accent model to the associated accent;
    recording by a recording system a speech sample of a call responder having a call responder accent;
    inputting the speech sample for analysis;
    preparing a statistical speech model representing the speech sample of the call responder;
    comparing the statistical speech model with said statistical accent models;
    determining a closest statistical accent model to said statistical speech model;
    assigning an accent score for the statistical speech model, the accent score corresponding to the model accent score of the closest statistical accent model; automatically amending in the speech sample by replacement waveforms, sections determined as having known errors, whereby the amended speech sample replaces the speech sample to conform to the closest accent model; and providing during the call conducted by the call responder an immediate visual feedback indicating the level of deviation of the agent from the required accent.

12. A method according to claim 11, wherein said determining is performed substantially in real-time.

13. A method according to claim 11, further comprising giving indication regarding segments of said speech sample which do not conform to the determined closest statistical accent model.

14. A method according to claim 13, wherein said indication is given substantially in real-time.

15. A method according to claim 11, further comprising notifying a speaker if the determined closest statistical accent changes during a conversation.

16. A method according to claim 11, wherein said determining further determines other characteristics of a speaker.

17. A method according to claim 11, wherein said one or more statistical accent models are updated based on speech signals from groups of substantially equally scoring users.

18. A method according to claim 11 wherein said accents are a pronunciation characteristic common to a group of people.

19. A method according to claim 11 wherein said accent is an acoustic speech feature that differentiates between individuals.

20. The method of claim 11, wherein the statistical accent models are created using at least one feature selected from the group consisting of: phonology, acoustic phonetics, and phonotactics.

21. The method according to claim 11, further providing a supervisor of the call responder with quality information feedback related to the accent score of the call responder.

22. The method according to claim 11, further comprising asking a caller to repeat a specific sentence with pre-selected sounds that are known to differentiate between different accents.

* * * * *